United States Patent
Dickie et al.

(10) Patent No.: US 9,910,855 B2
(45) Date of Patent: *Mar. 6, 2018

(54) REORDERING OF DATABASE RECORDS FOR IMPROVED COMPRESSION

(71) Applicant: International Business Machines Corporation, Armonk, NY (US)

(72) Inventors: Garth A. Dickie, Framingham, MA (US); Jeffrey M. Keller, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 219 days.

This patent is subject to a terminal disclaimer.

(21) Appl. No.: 14/644,762

(22) Filed: Mar. 11, 2015

(65) Prior Publication Data

US 2015/0347426 A1 Dec. 3, 2015

Related U.S. Application Data

(63) Continuation of application No. 14/287,589, filed on May 27, 2014.

(51) Int. Cl.
  *G06F 17/30* (2006.01)
  *G06F 7/36* (2006.01)

(52) U.S. Cl.
  CPC ......... *G06F 17/30082* (2013.01); *G06F 7/36* (2013.01); *G06F 17/30153* (2013.01); *G06F 17/30315* (2013.01); *G06F 17/30595* (2013.01)

(58) Field of Classification Search
  CPC ......... G06F 17/30153; G06F 17/30371; G06F 17/30138; G06F 17/30501;
  (Continued)

(56) References Cited

U.S. PATENT DOCUMENTS 8,478,731 B1 7/2013 Throop et al.
2005/0192994 A1* 9/2005 Caldwell ........... G06F 17/30286
(Continued)

OTHER PUBLICATIONS

List of IBM Patents or Patent Applications Treated as Related, Mar. 24, 2015.

*Primary Examiner* — Dung K Chau
(74) *Attorney, Agent, or Firm* — Erik K. Johnson; Edell, Shapiro & Finnan, LLC

(57) ABSTRACT

According to embodiments of the present invention, apparatus, systems, methods and computer program products for sorting and compressing an unordered set of data records from a structured database are provided. Fields of the unordered set of data records are prioritized based on an impact of those fields to a compression scheme for column-oriented compression. The unordered set of data records are sorted based on the prioritized field(s) with a greatest impact on the performance metric. Data of the sorted data records are compressed according to a compression scheme. In some embodiments, prioritizing the fields may be based on an anticipated level of usage of data within those fields and/or a cost function associated with a performance metric as well as optimization of compression. A performance metric may include a faster computational time, reduced I/O computation, faster scan time, etc.

6 Claims, 9 Drawing Sheets

(58) Field of Classification Search
CPC ......... G06F 17/30315; G06F 17/30339; G06F 17/30312; G06F 17/30091; G06F 17/30598; G06F 17/30917; G06F 21/62
USPC ................ 707/693, 753, 756, 758, 999.101; 709/204, 225; 715/764
See application file for complete search history.

(56) References Cited

U.S. PATENT DOCUMENTS

| | | | |
|---|---|---|---|
| 2007/0050777 A1* | 3/2007 | Hutchinson | G06F 11/0709 718/104 |
| 2010/0030796 A1* | 2/2010 | Netz | G06F 17/30501 707/756 |
| 2011/0078243 A1* | 3/2011 | Carpenter | G06F 17/246 709/204 |
| 2012/0069131 A1* | 3/2012 | Abelow | G06Q 10/067 348/14.01 |
| 2013/0170762 A1 | 7/2013 | Marti et al. | |
| 2013/0275612 A1 | 10/2013 | Voss et al. | |

\* cited by examiner

| | | | |
|---|---|---|---|
| 210(1) | 6783 | 4678 | 4356 | • • •
| | 220(1) | 220(2) | 220(3) |
| 210(2) | CA | TN | MD | • • •
| | 222(1) | 222(2) | 222(3) |
| 210(3) | 30,047 | 2,040 | 24,907 | • • •
| | 224(1) | 224(2) | 224(3) |

REORDERING OF DATABASE RECORDS FOR IMPROVED COMPRESSION

CROSS-REFERENCE TO RELATED APPLICATIONS

This application is a continuation of U.S. patent application Ser. No. 14/287,589, entitled "REORDERING OF DATABASE RECORDS FOR IMPROVED COMPRESSION" and filed May 27, 2014, the disclosure of which is incorporated herein by reference in its entirety.

BACKGROUND

Present invention embodiments relate to reducing computational workload for query evaluation, and more specifically, to reducing computational workload and/or storage requirements by reordering sequences of records to optimize compression and/or scan performance in a compressed-computation database.

In a data warehouse utilizing relational databases to house large amounts of data, query performance may be limited by scan performance. Relational databases rely heavily on data compression, not only to reduce storage requirements, but also to reduce input/output (I/O) and memory usage. In systems which operate directly on compressed data, compression can also dramatically reduce processor usage. In many systems, records are usually compressed in the order of receipt or generation, which may lead to sub-optimal compression and sub-optimal performance.

To improve compression, records within a unit of data may be reordered to optimize overall compression. Such techniques, which may include user-directed partitioning and multi-dimensional clustering, may group similar records together, in order to improve overall compression. Additionally, other techniques may include user-directed sorting on a particular column.

SUMMARY

According to embodiments of the present invention, apparatus, systems, methods and computer program products for sorting and compressing an unordered set of data records from a structured database are provided. Fields of the unordered set of data records are prioritized based on an impact of those fields to a performance metric for accessing data stored in a column-oriented compressed database. The unordered set of data records are sorted based on the prioritized field(s) with a greatest impact on the performance metric. Data of the sorted data records are compressed according to a compression scheme, in some embodiments, prioritizing the fields may be based on an anticipated level of usage of data within those fields and/or a cost function associated with a performance metric as well as optimization of compression. A performance metric may include a faster computational time, reduced I/O computation, faster scan time, etc., or any other metric indicative of a change in performance.

These and other aspects, features and advantages of the present invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

Generally, like reference numerals in the various figures are utilized to designate like components.

FIG. 2B is an illustration of an example of a hybrid column data store for use with an embodiment of the present invention.

DETAILED DESCRIPTION

Figure 1:
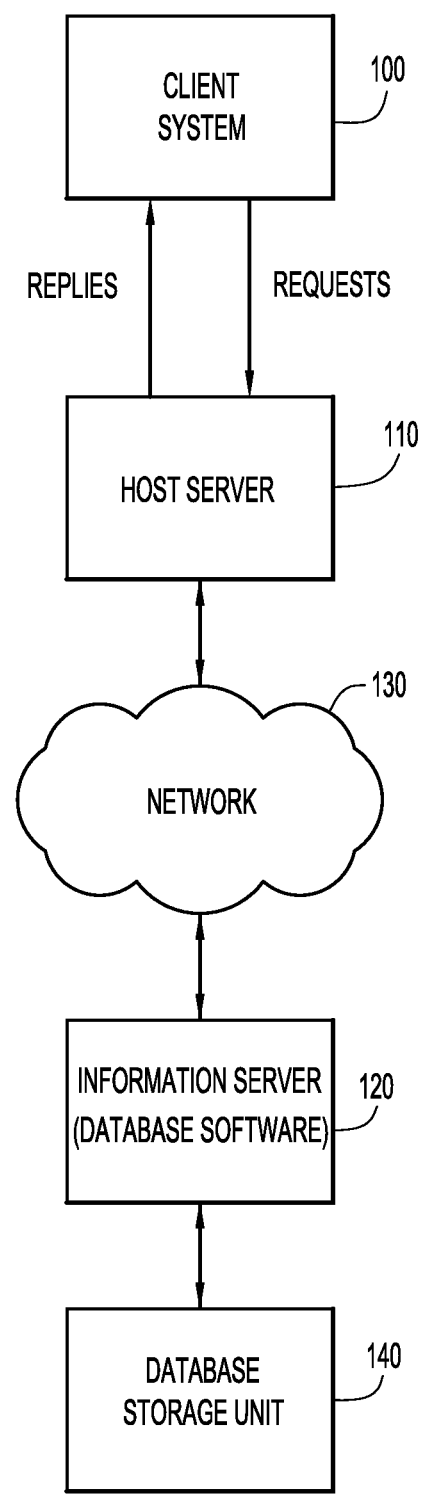
FIG. 1 is an illustration of an example computing environment for use with an embodiment of the present invention.

In a data warehouse utilizing relational databases to house large amounts of data, query performance may be limited by scan performance. The amount of time needed to scan through large amounts of data, in order to determine whether a particular region of storage contains data relevant to the query, may be a rate limiting factor in determining the amount of time needed for processing a query.

Relational databases rely heavily on data compression, not only to reduce storage requirements, but also to reduce I/O computation and memory usage. In systems which operate directly on compressed data (i.e. without first decompressing the data), compression can also dramatically reduce Central Processing Unit (CPU) usage. In many systems, records are usually compressed in the order of receipt or generation, which may lead to sub-optimal compression and performance.

In compressed-computation databases, in which queries may be performed on compressed data, scanning a data storage region having optimized compression of its records may occur faster than the same storage regions with poor compression optimization. Optimized compression generally refers to minimizing the number of bytes or bits needed to represent an amount of data, for each column of a data store, but it may also refer to minimizing the time to perform an operation on the data, even if that does not minimize the representation size of the data.

However, ordering records simply to obtain the best overall compression may not necessarily lead to optimal performance. For example, if data is sorted and compressed based on a particular column of a plurality of columns, and the sorted column is scanned infrequently as compared to the other columns, then a performance benefit may not be obtained. In some cases, optimizing compression with respect to a selected column may lead to worse compression in other columns, and if the other columns having worse compression are accessed more frequently than the selected column, performance may actually decrease.

Present invention embodiments disclosed herein include methods, systems, apparatus and computer readable media to obtain a maximum performance benefit from compression in a columnar database, even if compression with regards to space utilization is not optimal. It is noted that present invention embodiments may also be applied to relational databases in general, and are not limited to columnar or hybrid-columnar databases as disclosed herein. According to embodiments of the present invention, apparatus, systems, computer implemented methods and computer program products for sorting and compressing an unordered set of data records from a structured database are provided. Fields of the unordered set of data records are prioritized based on an impact of those fields to a performance metric for accessing data stored in a column-oriented compressed database. The unordered set of data records are sorted based on the prioritized field (or fields) with a greatest impact on the performance metric. Data of the sorted data records are compressed according to a compression scheme. In some embodiments, prioritizing the fields may be based on an anticipated level of usage of data within those fields and/or a cost function associated with a performance metric.

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

With reference now to FIG. 1, an example computing environment for use with present invention embodiments is illustrated. Specifically, the environment includes one or more client or end-user systems 100 and one or more server systems 110 and 120, Host server system 110 and information server 120 may be remote from each other and communicate over a network 130. Query requests, originating from client system 100 may be transmitted to information server 120 to search stored data on database storage unit 140. Network 130 may be implemented by any number of any suitable communications media (e.g., wide area network (WAN), local area network (LAN), Internet, Intranet, etc.). Alternatively, server systems 110 and 120 may be local to each other, and communicate via any appropriate local communication medium (e.g., local area network (LAN), hardwire, wireless link, Intranet, etc.).

Client system(s) 100 enable users to submit documents (e.g., documents for document collections, documents for analysis, etc.) to information server system 120 for storage in a database storage unit. As discussed herein, documents (or other information) may be added to existing database storage as storage regions (also referred to as extents). Client systems 100 may also be used to submit input fields as part of the process of performing queries.

Database storage unit 140 may store information for analysis (e.g., compressed data records, etc.), and may be implemented by any conventional or other database or storage unit. Examples of types of storage are shown below in conjunction with FIGS. 2A-2C. Database storage unit 140 may be local to or remote from information server 120, and may communicate via any appropriate communication medium (e.g., local area network (LAN), wide area network (WAN), Internet, hardware, wireless link, Intranet, etc.), Client system 100 may present a graphical user (e.g., GUI, etc.) or other interface (e.g., command line prompts, menu screens, etc.) to solicit information from users pertaining to the desired documents and analysis, and may provide reports including analysis of results (e.g., text analytics, search results, etc.) to a user.

A plurality of database storage units 140 may be present in a data warehouse. An information server 120 may store and retrieve information from database storage unit 140, at the direction of host server 110.

Figure 2A:
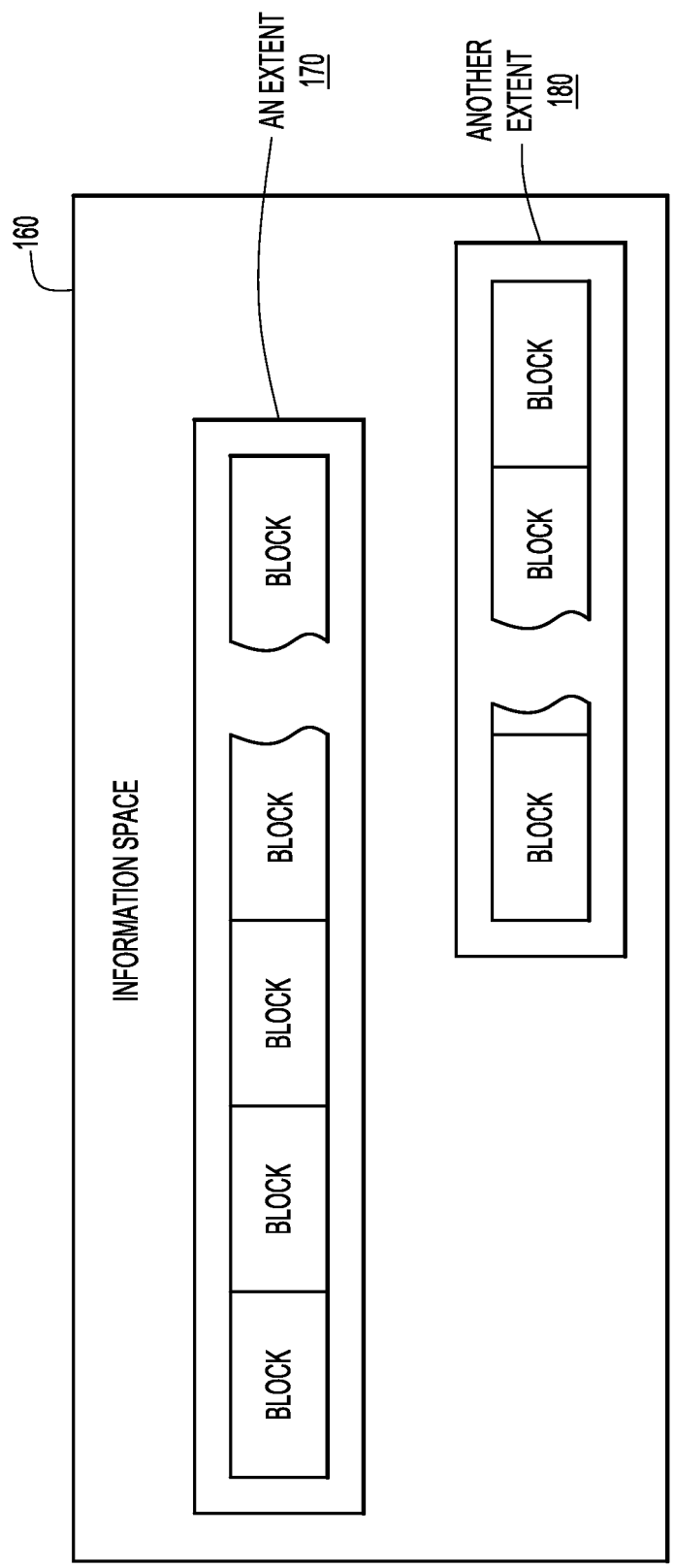
FIG. 2A is an illustration of an example of regions of table storage according to an embodiment of the present invention.

Present invention embodiments may be applied broadly to relational databases, and to hybrid column stores or column stores. Referring to FIG. 2A, a large space of information 160 is shown as being divided into multiple smaller regions of information 170 and 180 (also referred to as "extents" or "storage regions"). Each extent may be further subdivided into a number of contiguous fixed size or variable size sub-extent blocks or pages. A block is the smallest unit of transfer between the database storage unit 140 holding the entire information space and the information server 120 capable of examining and manipulating the information. In one embodiment, a block may be 64K or 128K bytes, but other sizes could work as well.

An extent 170, 180 is a convenient unit of storage allocation, so that as an information space grows, its growth is quantized into units of extents. While the address space within an extent is contiguous (i.e., no holes) an information space 160 may consist of discontiguous extents, as there is no requirement that a later allocation of an extent should produce an address range that bears any fixed relationship to the address range of any earlier allocation.

Referring to FIG. 2B, an example of a hybrid column store, also known as a Partition Attributes Across (PAX) data store, is shown. In a PAX data store, each page (or extent or block) 205 represents a group of rows. Within a block, column 1 is stored first, shown as 210(1), containing column 1 values for each row in the group. Corresponding data points are shown, e.g., as fields 220(1)-220(3). Column 2 is stored separately from column 1, shown as 210(2), and column 3 is stored separately from columns 1 and 2, shown as 210(3), etc., with corresponding data points shown as 222(1)-222(3) and 224(1)-224(3). In this scheme, reduced I/O is possible by reading the column 1 part of the block, or other columns that are needed for the query (and not the other columns). Performance benefits are particularly significant with a Solid State Drive (SSD)-like or Random Access Memory (RAM) storage device, which is capable of handling many small I/Os.

Accordingly, hybrid column stores may utilize a combination of both row and columnar methods for storing data. Hybrid columnar databases may include a sequence of records stored as a tuple of correlated columns, with the i-th element of the j-th column representing the j-th field of the i-th record.

Present invention embodiments may also be of some use in more traditional (row-based) databases as well.

Figure 2C:
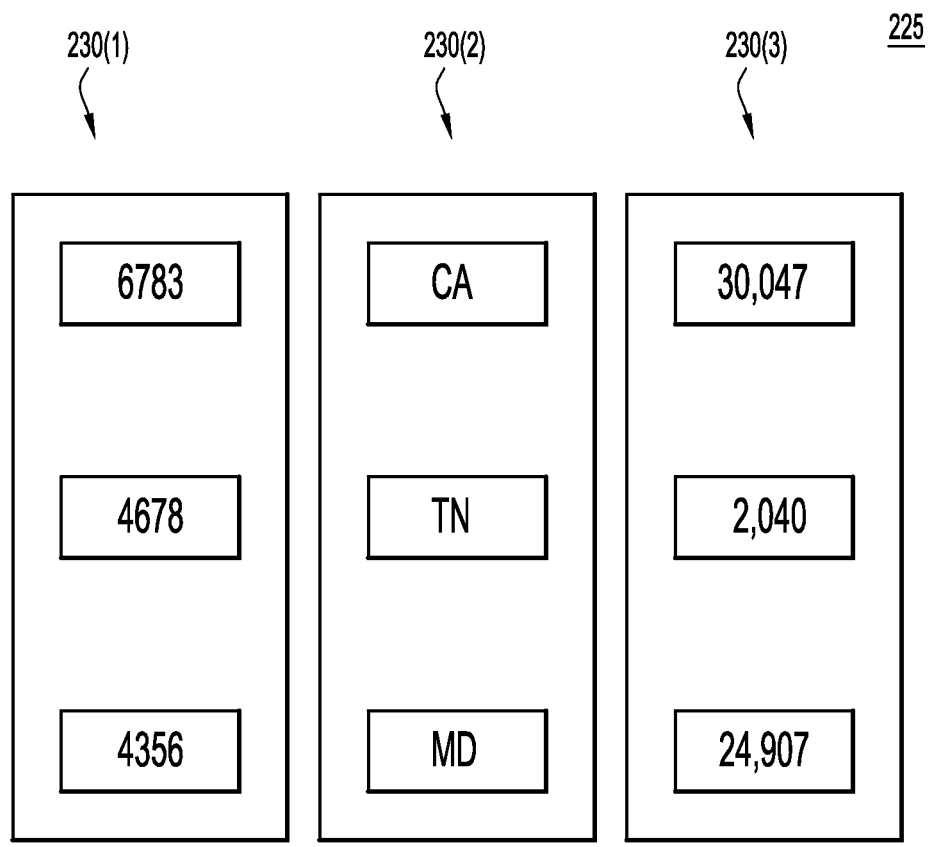
FIG. 2C is an illustration of an example of a columnar data store for use with an embodiment of the present invention.

Referring to FIG. 2C, an example of a separate-column data store is shown at 225. Columns are shown at 230(1)-230(3), in a separate-column-storage scheme, column 1 230(1) for a group of rows is stored in a location, column 2 230(2) for the next group of rows is stored in another location. Column 3 230(3) is stored in yet another location. In this scheme, a benefit is achieved from reading the columns which are needed for a particular query instead of the entire data unit (and not the other columns).

Figure 3:
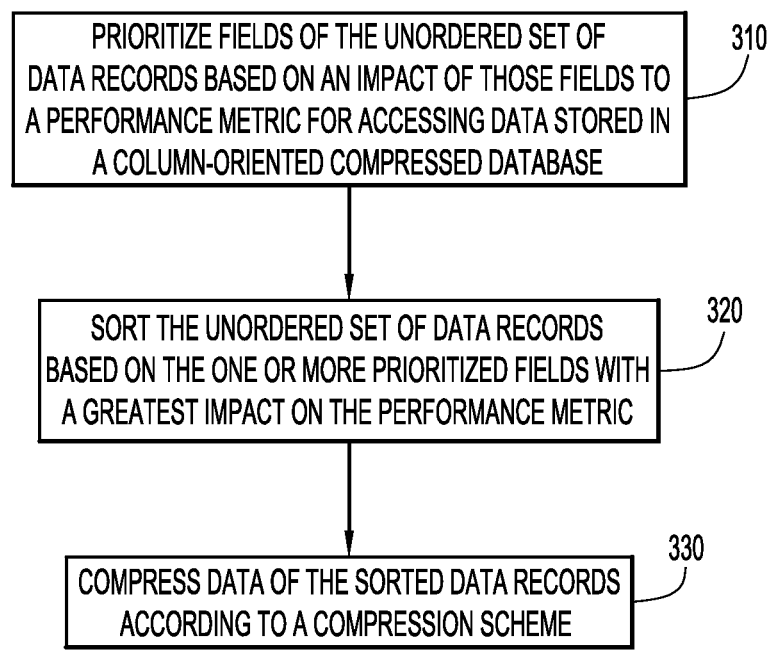
FIG. 3 is a procedural flow chart generally illustrating reordering data based upon a prioritized field, according to an embodiment of the present invention.

Referring to FIG. 3, present invention embodiments include obtaining an improved performance benefit, in regards to scanning blocks or pages of data (or any other suitable unit of data) in a relational database, even if overall compression of the data is not optimal. For purposes of the discussion herein, the data is presumed to be in the form of a set of records (e.g., rows) such that the order of the records is of little or no importance to the correctness of query results.

Data records are typically compressed in the order of receipt or generation, which may lead to sub-optimal scanning performance. By identifying one or more fields of the unordered set of data records according to the techniques disclosed herein, and sorting and compressing the data records based upon the identified field(s), improved scan performance may be obtained. Such techniques also generally assume that in any given query, not all of the columns (or rows, in the case of a hybrid column store) need to be read.

At operation 310, fields of the unordered set of data records based on an impact of those fields to a performance metric for accessing data stored in a compressed database are prioritized. In order to determine a sort order for an unordered set of data records, fields of the unordered set of data records may be prioritized in part based upon an impact of those fields to a compression scheme for column-oriented compression. In some embodiments, columns comprising a type of data which is sensitive to sort order may be assigned a higher priority than columns not sensitive to sort order. Examples of columns that may be sensitive to sort order include columns comprising numeric data as well as character data with repeating strings. Compression schemes for such data types are discussed herein. Fields may also be prioritized based upon an impact to a performance metric, as discussed herein.

At operation 320, the unordered set of data records may be sorted based on the prioritized field(s) with a greatest impact on the performance metric. At operation 330, data of the sorted data records is compressed according to a compression scheme.

Present invention embodiments may encompass any suitable compression scheme, including Run-Length Encoding (RLE) (for numeric values), Delta Encoding (for numeric values), Prefix Encoding (for string values), etc. The impact of sort order on compression of a column is particularly evident in the cases of RLE, Delta Encoding, and Prefix Encoding, which each may provide long run lengths for sorted data, which is particularly desirable to achieve optimal compression. Any suitable compression technique, sensitive to sort order, is understood to fall within the scope of the embodiments presented herein.

RLE is typically represented as a sequence of values with a corresponding length for each value. For example, a column of data comprising a sequence of input values: 25, 25, 25, 2, 40, 9, 40, 9 may be compressed using a encoding of RLE(values=(25, 2, 40, 9, 40, 9), lengths=(3, 1, 1, 1, 1, 1). If the column is reordered, improved compression may be obtained. Upon sorting, the sequence: 2, 9, 9, 25, 25, 25, 40, 40 may be compressed using an encoding of RLE (values=(2, 9, 25, 40), lengths=(1, 2, 3, 2)).

Delta encoding stores the first value of a series of input values as a base value and the difference between each pair of successive values. For example, a sequence of ordered input values: 17, 19, 21, 23, 25 and 27 may be encoded as delta(base=17, deltas=(2, 2, 2, 2, 2)).

Prefix encoding operates in a similar manner. For an input string: "use", "useful", "usefulness" etc., values may be stored in an array as follows:

0=>"use"
1=>"0ful"
2=>"1ness"

As demonstrated by the above examples, any suitable compression scheme sensitive to the order of the data may be employed.

Figure 4A:
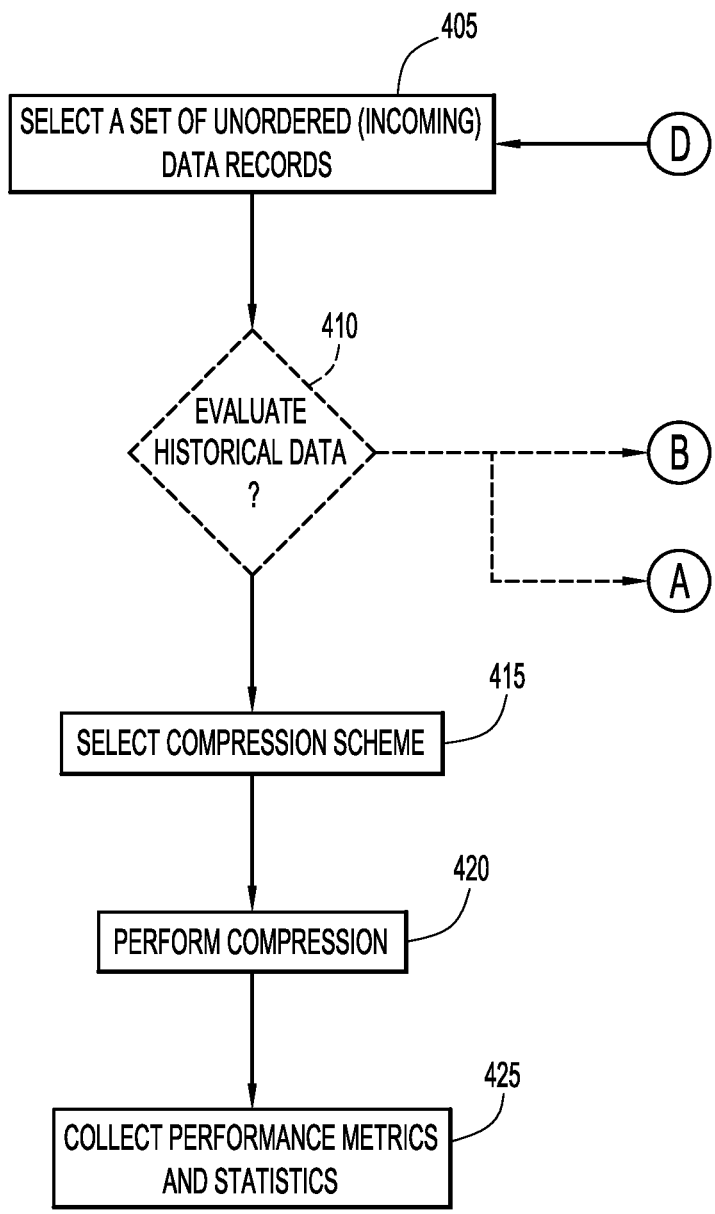
FIGS. 4A-4C are more specific procedural flow charts based upon the flow chart of FIG. 3 and illustrating a manner in which incoming data and existing data may be ordered and compressed, according to an embodiment of the present invention.
Figure 4B:
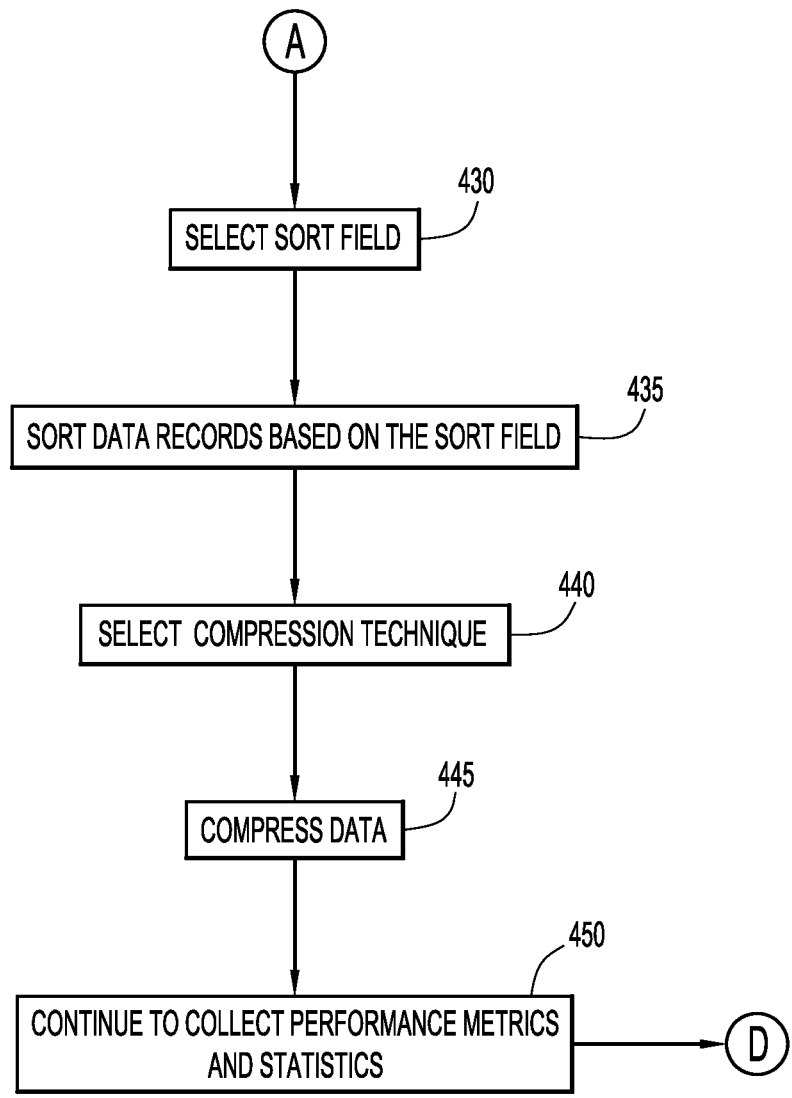
Figure 4C:
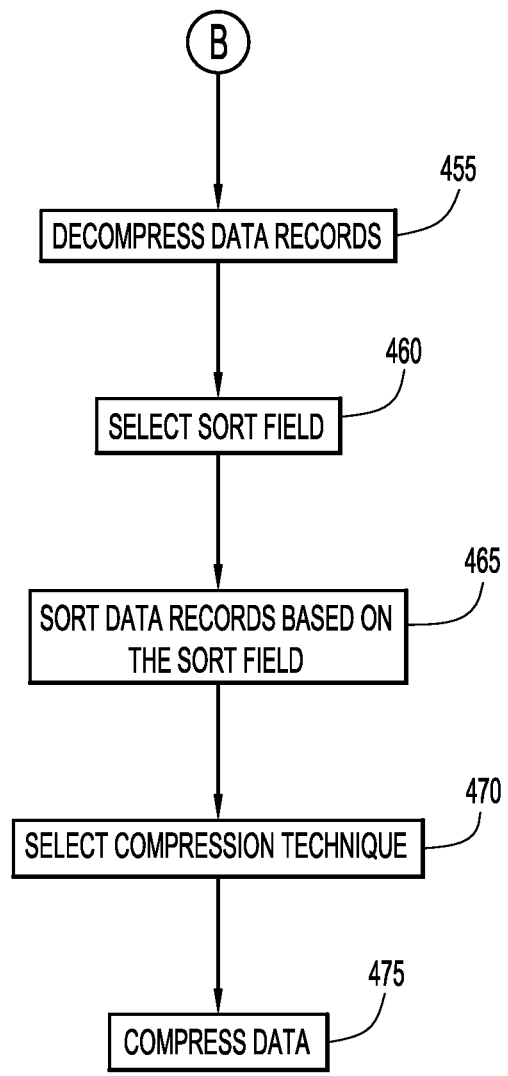

Referring to FIGS. 4A-4C, procedural flow charts based upon the flow chart of FIG. 3 are shown which generally illustrate a manner in which incoming data and existing data may be ordered and compressed, according to an embodiment of the present invention.

Assigning priority to a column (or columns) based on a performance metric may be impacted by a variety of factors, including an impact to a compression scheme (e.g., improved compression as compared to the original order, as discussed herein), a frequency with which a column is accessed, a cost function, or any combination thereof. Additional considerations may include simplicity of compression, speed of compression, compressed size of the data, compressed size of the most heavily used columns, and/or speed of operation on the most heavily used columns, etc.

For example, identifying and assigning a higher priority to a column (or combination of columns) that is read more frequently (as compared to columns that are read less frequently) may help achieve a performance benefit. In some cases, selecting a column read with a higher frequency than other columns, sorting the data based on the selected column, and utilizing a compression scheme to minimize the memory required to store the compressed data of that column, may lead to better performance. Even if the other columns of lower priority are reordered in such a manner that compression is less optimal in those other columns (e.g., increased memory may be needed to store columns of lower priority), a performance benefit may still be obtained if the higher priority column is read with a higher frequency than the other columns. Additionally, the total I/O cost of accessing the data may be reduced as well. Columns can be prioritized according to how often they are used in compression-aware computation, to reduce the total computational cost of queries against the database table.

In other embodiments, sorting may be driven by a cost function that assesses an amount of work performed on data for a given compression scheme. Cost functions may consider how, and not just how often, a column is to be used. For example, a character column might be used primarily in equality tests, in which case Huffman encoding will be very efficient for computation (since the predicate can be evaluated on the compressed data by using the same Huffman code for the right hand side of the comparison). As another example, a character column might be used primarily in expressions where it is first converted to all lower case, in which case prefix, dictionary, and RLE compression may be allowed, but Huffman coding may be excluded. As still another example, for a column of numbers which is well-compressed using delta encoding, if this column is only projected, and has no computation, then delta encoding will be very efficient, and should generally be used. However, if the column is frequently used in comparisons and arithmetic, then delta encoding will be very inefficient as compared to other forms of encoding, such as RLE or dictionary compression, and delta encoding should generally be avoided.

Several examples of cost functions are provided as follows: (1) frequency of reads of column vs. other columns*compressed size of column; (2) number of compressed computations on column*compressed size of column; (3) fraction of total compute time spent on computations using column*compressed size of column; (4) modeled compute time given a chosen compression format for the column, and so forth. A sort column may be selected based upon minimizing the sum, computed over each relevant column in the table, of the respective cost function. Performance benefits may be driven by both an impact to a compression scheme (e.g., improved compression as compared to the original order) as well as time spent reading and computing on a column. In some embodiments, every column in the table may be considered, while in other embodiments, a subset of columns may be considered. The relevance of each column may be assessed by heuristics to determine which columns will have the most impact.

Accordingly, in some embodiments, statistics on previously observed data and/or historical usage patterns, e.g., determining which columns are the most heavily utilized, scan times for a sorted column having a particular type of compression, etc. will need to be maintained. In general, statistics which are useful for assessing a computational cost of running queries against a column or series of columns with a particular order aid/or compression may be stored.

Referring to FIG. 4, a flow chart is shown representing an example embodiment of the techniques presented herein. Operations 405, 415, 420 generally represent compression of incoming data. At operation 405, unordered data records are selected. These records may or may not be sorted according to e.g., a date field, a time field, etc. as determined by order of entry. At operation 415, a compression scheme is selected. Different compression schemes may be evaluated to determine a best compression scheme for a column. For example, several different compression schemes may be independently evaluated for each column, for each group of rows, etc. Any suitable compression scheme may be selected provided that such scheme is suitable for compressing the particular types of data of the data columns. In general, the type of compression is selected to best match the compression scheme to the type of computation which is performed during query processing. At operation 420, compression is performed on the set of data records. At operation 425, performance metrics and statistics may be collected.

At operation 410, once a sufficient number of scans, queries and compressions have been performed, sufficient historical data may be available to drive selection of a sort column for incoming data. The historical data may include statistics and/or performance data gathered during processing such as: columns that are being read most frequently, a total I/O cost incurred in reading those columns during queries, a cost function for evaluating sort orders, metrics associated with compression, etc. The historical data may be evaluated as described herein, and may indicate that a performance benefit may be achieved based upon sorting the data by a particular sort field (or fields).

Thus, for incoming data that has not yet been compressed, historical data may indicate performance benefits for selecting a particular sort column, and the process may continue at operation 430, as via "A" (FIG. 4B). For data that has already been stored in compressed format, the process may continue at operation 445, via "B" (FIG. 4C). Columns may be sorted based on heuristics (e.g., experimental methods, etc.) associated with historical usage patterns.

Once a sort order has been selected, the unordered set of data records may be sorted based on the highest prioritized field or a combination of highest priority fields. Successively lower-priority fields may be used to resolve ties. The higher-priority fields will thus be favored in compression. For example, if 10 fields are prioritized, and the first 8 fields tie (e.g., due to low cardinality), then the ninth field may be evaluated to resolve the tie.

With reference now to FIG. 4B, analysis of historical data has indicated that a performance benefit may be obtained by sorting data on a particular column. Operations 430-445 generally apply to sorting and compression of incoming data that has not been previously compressed. Thus, present invention embodiments allow for incoming data to be compressed in a different manner than existing data, without changing the order of existing data.

At operation 430, a sort field is selected. The sort field is a sort field of highest priority, as determined based upon collected historical data. At operation 435, data records are sorted based upon the sort field. At operation 440, a compression scheme is selected. Different compression schemes may be evaluated to determine a best compression scheme for a column. For example, several different compression schemes may be independently evaluated for each column, for each group of rows, etc. The compression scheme is suitable for compressing the particular types of data in the table, and may include multiple types of compression for each type of data. At operation 445, data is compressed. At operation 450, performance metrics and statistics continue to be collected. The process then returns to operation 405, via "D".

With reference to FIG. 4C, an example flow chart is shown for sorting (or resorting) existing data. At operation 455, data records are decompressed. In some embodiments, data will not be globally decompressed, but will be decompressed with regard to a specific region. At operation 460, a sort field (or fields) is selected based upon historical data, wherein the sort field is of a higher priority than the other fields. At operation 465, data records are sorted based on the sort field. At operation 470, different compression schemes may be evaluated to determine a best compression scheme for a column. For example, several different compression schemes may be independently evaluated for each column, for each group of rows, etc. If selection of a different compression scheme may improve compression, a different compression scheme, other than the one previously implemented, may be chosen at 370. Data is then fed back into the compression engine at 475, and compressed in order of receipt.

Examples of present invention embodiments also apply to grooming operations. In grooming operations, existing data stored in compressed format in a table is reprocessed. Data may be deleted and reinserted such that data near the back of a data store is deleted and reinserted at the front of the data store, and may be inserted in a particular sort order. As the data is being reinserted at the front of the data store, the data is processed through a compression path, which may include utilizing a cost function, compression benefits, or other frequency based criteria for choosing a sort order. In other embodiments, grooming operations may be used to remove rows which have been deleted in-place but which are still occupying space.

In some embodiments, sorting is performed locally (as opposed to globally). For instance, if records are already being grouped into batches, it may be natural to sort the records within each batch, rather than the global data set, Performing sorting locally (i.e. zone by zone) may be more beneficial than performing sorting globally. The global order (determined by the user via "ORGANIZE BY" and/or insertion order) may determine how records are grouped into zones. This grouping is important because it affects locality of reference, and it is unaffected by the proposed local reordering. The local order (i.e. the order of records within a zone) is less important in terms of locality of reference but may be important in terms of quality of compression and/or speed of operation (particularly of operation on compressed data).

For example, sorting data based on column A may lead to a 3% performance increase in query speed, and sorting data based on column B may lead to a 5% performance increase due to better data compression. Sorting data to optimize compression in column B may lead to an improved performance benefit as compared to column A. However, if column A is accessed with a frequency that is, e.g., 3× more frequent than column B, then sorting by column A would result in a greater overall performance benefit than sorting by column B, even though column B may exhibit better compression, e.g., more efficient memory utilization. Similarly, other columns which may have even greater compression but are used less frequently would also generally not exhibit performance increases as substantial as column A, if such columns are accessed at a lower frequency.

It is also understood that present invention embodiments may be applied in an ongoing manner. As patterns of access change over time, different sort columns may be selected to ensure that a performance benefit is maintained.

Other considerations impacting performance may include: simplicity of compression, speed of compression, compressed size of the data within a zone, compressed size of the PRIMARY KEY column (if any), compressed size of the most heavily used columns, speed of operation on the most heavily used columns, redundancy within the column, or any combination thereof. Examples are described in additional detail below.

With regard to simplicity of compression, a simpler compression scheme (as compared to a more complex compression scheme) may be a good proxy for speed of computation on the compressed data. For data which is used heavily in computation (with no further knowledge of how the data is used), a compression scheme such as bitshaved compression may be chosen over a scheme such as delta encoding because, in general, more optimizations are possible when computing on bitshaved data as compared to other types of compressed data. Bitshaved encoding represents values as offsets relative to a base value, storing a base value of a sequence (e.g., a lowest value, minimum value, zero, etc.) and the difference between the base value and another value of the sequence.

With regard to speed of compression, some compressions schemes, such as computing a dictionary, can be expensive in terms of speed of compression, but can have a large positive impact on performance of computation. If such a table is to be heavily utilized, performance benefits may outweigh the cost of computing. However, if a table is being written only to be read once and discarded, simpler compression schemes, such as bitshaved compression or RLE compression, may be chosen instead.

With regard to speed of operation on the most heavily queried columns, a column may be monitored to determine what the column is being used for, e.g., which operators run against the column. For example, available metadata for an operator could reflect how effectively that operator is able to optimize its performance by taking advantage of different compression types. For example, some operators such as strings, e.g., "to_lower" or "to_upper", may be very simple on a dictionary coded stream, and more difficult on a character-huffman-coded or Lempel-Ziv-Welch (LZW)-compressed stream. Accordingly, columns that are mainly used with regard to "to_lower" operators may be compressed using dictionary compression in preference to other possible schemes. If a column has multiple uses, a decision about which compression scheme to use may be made after weighing the benefit of each candidate scheme.

Figure 5:
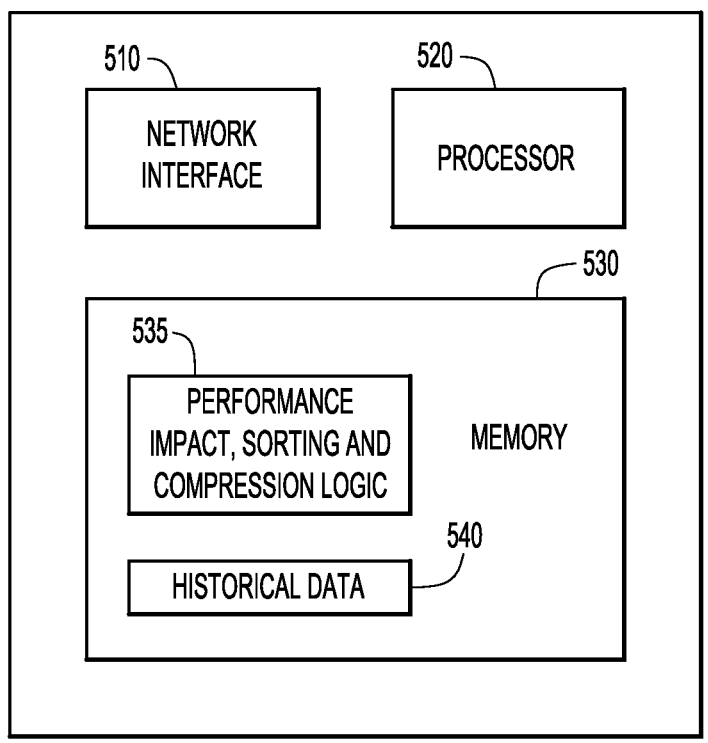
FIG. 5 is an example of a system/apparatus according to an embodiment of the present invention.

Referring to FIG. 5, an example embodiment of an information server 120 may comprise a network interface 510, a processor 520 and a memory 530. The network interface unit 510 is configured to enable network communications over network 130 e.g., to facilitate communication between information server 120 and host server 110 regarding query requests from client system 100 as shown in FIG. 1.

The processor 520 may be embodied by one or more microprocessors or microcontrollers, and executes computer readable program instructions stored in memory 530 to perform the operations described above in connection with FIGS. 1-4.

Memory 530 may comprise computer readable storage media encoded with software comprising computer readable program instructions, and when the software is executed by the processor 520, the processor 520 is operable to perform the operations described herein in connection with zone map creation, sorting and evaluation logic 535. Historical data is shown at 540.

Server systems 110 and 120 and client systems 100 may be implemented by any conventional or other computer systems preferably equipped with a display or monitor, a base (e.g., including at least one processor, one or more memories, and/or internal or external network interfaces or communications devices (e.g., modem, network cards, etc.)), optional input devices (e.g., a keyboard, mouse or other input device), and any commercially available and custom software (e.g., server/communications software, module, browser/interface software, etc.).

Client systems 100 enable users to submit documents (e.g., documents for document collections, documents for analysis, etc.) to server systems 110 and 120 for storage. The server systems include a module 535 to determine performance, sort data and apply compression schemes. A database system 120 may store various information for the analysis (e.g., performance information determined based upon historical data). The database system may be implemented by any conventional or other database or storage unit, may be local to or remote from server systems 110 and 120 and client systems 100, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the desired documents and analysis, and may provide reports including analysis results (e.g., performance benefits, etc.).

Server systems 110 and 120 and client systems 100 may be implemented by any conventional or other computer systems preferably equipped with a display or monitor, a base (e.g., including at least one processor 520, one or more memories 530 and/or internal or external network interfaces or communications devices 510 (e.g., modem, network cards, etc.)), optional input devices (e.g., a keyboard, mouse or other input device), and any commercially available and custom software (e.g., server/communications software, module, browser/interface software, etc.).

In a client system, the client system has access to a graphical user (e.g., GUI, etc.) or other interface (e.g., command line prompts, menu screens, etc.) to solicit information from a corresponding user pertaining to the desired documents and analysis, and may provide reports including analysis results.

Module may include one or more modules or units to perform the various functions of present invention embodiments described below. The various modules (e.g., logic 535) may be implemented by any combination of any quantity of software and/or hardware modules or units, and may reside within memory 530 of the server and/or client systems for execution by processor 520.

It will be appreciated that the embodiments described above and illustrated in the drawings represent only a few of the many ways of implementing embodiments for sorting data to achieve a performance benefit.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software (e.g., performance impact, sorting and compression logic, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., performance impact, sorting and compression logic, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., historical data). The database system may be implemented by any lumber of any conventional or other databases, data stores or storage structures (e.g., files, databases, data structures, data or other repositories, etc.) to store information (e.g., historical data). The database system may be included within or coupled to the server and/or client systems. The database systems and/or storage structures may be remote from or local to the computer or other processing systems, and may store any desired data (e.g., historical data).

The present invention embodiments may employ any number of any type of user interface (e.g., Graphical User Interface (GUI), command-line, prompt, etc.) for obtaining or providing information (e.g., historical data), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any system in which achieving a performance benefit with regard to accessing compressed data is desired.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of compressing an unordered set of data records from a structured database comprising:
   prioritizing a plurality of fields of the unordered set of data records based on an impact of those fields to a performance metric for accessing data stored in a column-oriented compressed database;
   selecting one or more of the prioritized fields based on priority of the prioritized fields, wherein the priority is based on a frequency of access of the fields;
   sorting the unordered set of data records based on the selected one or more prioritized fields for compression and optimal performance; and
   compressing data of the sorted data records according to a compression scheme to increase performance for accessing the data stored in the column-oriented compressed database.

2. The method of claim 1, wherein prioritizing the fields is based on a performance metric as assessed by a cost function, the cost function including minimizing a total amount of time reading and computing on a column as well as the compressed size of data in the column.

3. The method of claim 1, wherein sorting the unordered set of data records further includes:
   sorting the unordered set of data records based on a prioritized tuple of sort keys.

4. The method of claim 1, wherein the unordered set of data records is from a columnar database or a hybrid columnar database.

5. The method of claim 1, wherein the performance metric is determined based upon historical data.

6. The method of claim 1, further comprising:
   updating, based upon monitored performance metrics, relative priorities of the various fields to each other;
   decompressing a set of ordered compressed records to obtain an unordered set of data records;
   sorting the unordered set of data records based on the updated field priorities to obtain a second set of sorted data records; and
   compressing data of the second set of sorted data records according to a compression scheme.

* * * * *